US005604970A

United States Patent [19]

Aigner et al.

[11] Patent Number: 5,604,970

[45] Date of Patent: Feb. 25, 1997

[54] BOLT AND BAR ATTACHMENT METHOD FOR AUTO ASSEMBLY

[75] Inventors: Helmut R. Aigner; Michael R. Ahlgren, both of Colorado Springs, Colo.

[73] Assignee: Schlage Lock Company, San Francisco, Calif.

[21] Appl. No.: 578,775

[22] Filed: Dec. 26, 1995

[51] Int. Cl.$^6$ .................... B23P 19/02

[52] U.S. Cl. .................... 29/525; 29/525.08; 292/2

[58] Field of Search .................... 29/525, 525.01, 29/525.08, 2; 292/2

[56] References Cited

U.S. PATENT DOCUMENTS

| | | | |
|---|---|---|---|
| 477,021 | 6/1892 | Price | 292/2 |
| 789,790 | 5/1905 | Bigsby | 29/525.08 |
| 954,720 | 4/1910 | Diesel | 292/2 |
| 1,460,133 | 6/1923 | Hurd . | |
| 1,846,364 | 2/1932 | Schlage | 292/2 |
| 1,847,392 | 3/1932 | Full et al. . | |
| 2,125,655 | 8/1938 | Schlage | 292/2 |
| 3,107,122 | 10/1963 | Schlage | 292/192 |
| 3,180,663 | 4/1965 | Lehmann | 29/525.08 |
| 3,586,361 | 6/1971 | Ohno | 292/169 |
| 4,936,005 | 6/1990 | Dziurowitz | 29/525.08 |

*Primary Examiner*—David P. Bryant
*Attorney, Agent, or Firm*—Robert F. Palermo

[57] ABSTRACT

A method for automatically attaching a bolt for a mortise lock to its draw bar includes the steps of boring a hole longitudinally in the bolt on the axis of the bolt; drilling a hole, having a small diameter relative to that of the bored hole, transversely in the bolt to intersect the bored hole such that the drilled hole is tangent to the wall of the bored hole at its outer edge and intersects the bored hole at the midpoint of the depth of the bored hole; selecting a bar having a diameter which fits snugly in the bored hole; cutting a groove around the bar, the groove having a depth and width substantially equal to the diameter of the drilled hole, and being set back from a first end of the bar a distance substantially equal to half the depth of the bored hole; inserting the bar into the bored hole; and pressing a spring pin into the drilled hole.

1 Claim, 1 Drawing Sheet

BOLT AND BAR ATTACHMENT METHOD FOR AUTO ASSEMBLY

BACKGROUND OF THE INVENTION

This invention relates generally to door lock hardware and more particularly to a method and design for automatic assembly of mortise lock bolts.

Bolts for mortise locks are frequently made from hardened components in order to impart durability to the locksets. This fact not only increases the cost of such locks, but also makes fabrication of the parts and assembly of the locks more difficult. As an example, assembly of the bolt for a mortise lock is difficult and may result in excessive scrap losses.

Most commonly, mortise lock bolts are made by inserting the draw bar into a bore in the bolt body and drilling a transverse hole through the bolt body and the draw bar. Since the bolt body is usually through hardened while the draw bar is case hardened, there is an increased probability of the drill wandering at the interface between the two components. This can cause breakage of drill bits, which is costly and time consuming to deal with; or crooked holes, which make assembly difficult if not impossible. If drilled separately, there is a possibility that holes in the bolts won't match holes in the draw bars when the draw bars are inserted in the bolt bodies, and assembly will still be impossible or difficult, since pins will not press into holes which are not in alignment. Moreover, even if the holes are perfectly directed on the diameters of the bolt body and the draw bar, any slight misalignment of insertion of the bar into the bore will again make it impossible to press the spring pin into the drilled hole.

The foregoing illustrates limitations known to exist in present bolt assemblies for mortise locks and their method of assembly. It would, therefore, be advantageous to provide an alternative directed to overcoming one or more of those limitations. Accordingly, a suitable alternative is provided including features more fully disclosed hereinafter.

SUMMARY OF THE INVENTION

In one aspect of the present invention, a method for automatically attaching a bolt for a mortise lock to its draw bar is provided, including the steps of boring a hole longitudinally in the bolt on the axis of the bolt; drilling a hole, having a small diameter relative to that of the bored hole, transversely in said bolt to intersect said bored hole such that the drilled hole is tangent to the wall of the bored hole at its outer edge and intersects the bored hole at the midpoint of the depth of said bored hole; selecting a bar having a diameter which fits snugly in said bored hole; cutting a groove around said bar, said groove having a depth and width substantially equal to the diameter of the drilled hole, and being set back from a first end of said bar a distance substantially equal to half the depth of said bored hole; inserting the bar into the bored hole; and pressing a spring pin into the drilled hole.

The foregoing and other aspects of the invention will become apparent from the following detailed description, when considered in conjunction with the accompanying drawings.

DETAILED DESCRIPTION

Figure 1:
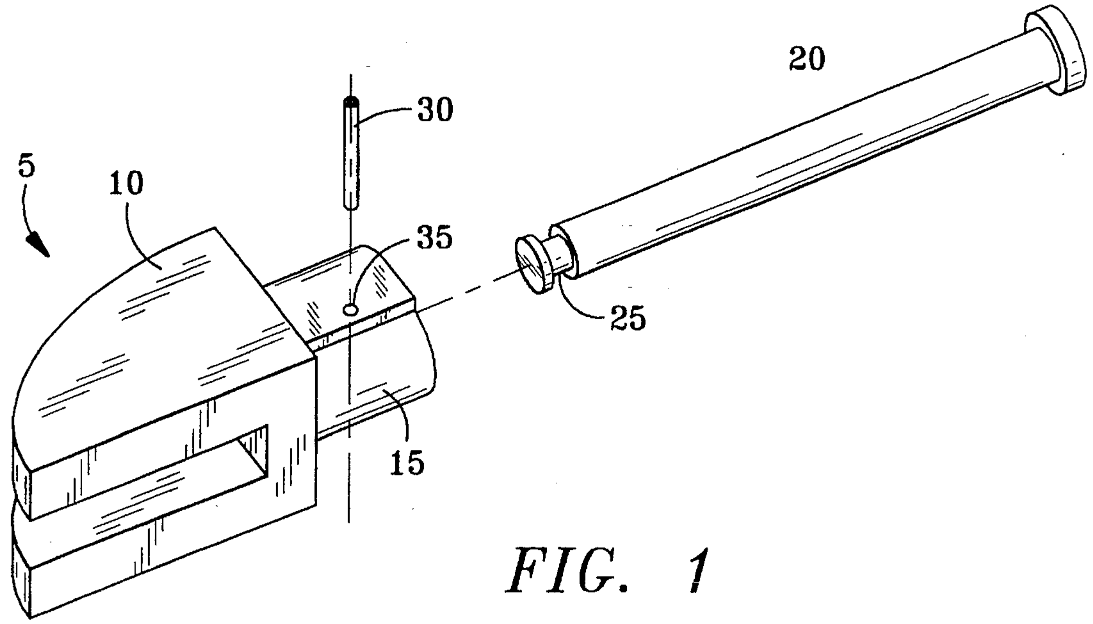
FIG. 1 is a schematic exploded perspective view illustrating a bolt body and draw bar only designed for assembly according to the present invention and omitting additional parts which, while forming part of a whole bolt assembly, do not affect the invention and are not a part thereof.
Figure 2:
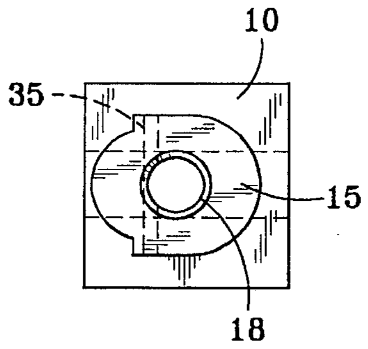
FIG. 2 is a schematic end view of the bolt body showing the bore and the transversely drilled hole in the attachment end of the bolt body.

The bolt assembly is shown in its bare essentials in FIG. 1 as an exploded perspective view. In describing the invention, it is best to refer to both FIG. 1 and FIG. 2 together, since there are features which are visible in one view and not in the other. The bolt body 5 has a latching end 10 and an attachment end 15. The attachment end 15 has a longitudinal bore 18 of a diameter equal to about ⅓ the thickness of the end. It also has a transverse drilled hole 35 which has a diameter equal to about ¼–⅕ of the bore diameter and which intersects the bore 18, at about the longitudinal midpoint of the bore, such that the outer edge of the drilled hole 35 is substantially tangent to the wall of the bore 18.

The draw bar 20 has a diameter providing a snug fit in the bore 18 and also has a groove 25 circumscribing its end. The groove 25 has a depth and width equal to the diameter of the drilled hole 35 and is situated on the draw bar 20 such that it aligns with the drilled hole 35 when the end of the draw bar is inserted to the end of the bore 18. Roll pin 30 is usually hardened to a spring temper and makes a press fit in drilled hole 35 and groove 25. Thus when the draw bar 20 is inserted in the bore 18 and pin 30 is pressed into drilled hole 35, the draw bar is firmly attached to the bolt body 5.

The advantages of this invention include the relative ease with which groove 25 can be cut around draw bar 20, the ability to drill the transverse hole prior to forming the bore 18, and the freedom to insert the draw bar 20 into the bore 18 without the need to align a specific part of the groove with the drilled hole 35. Thus, when the parts are properly made, they can readily be fed from vibratory feeders into automatic assembly fixtures and assembled. Such assembly is not possible with the standard design of bolts described in the BACKGROUND OF THE INVENTION. Further, even with manual assembly, the design disclosed herein adds to the speed and efficiency of assembly of such bolts.

Having described the invention, we claim:

1. A method for attaching a bolt for a mortise lock to its draw bar, comprising the steps of:

boring a hole longitudinally in said bolt on the longitudinal axis of the bolt;

drilling a hole, having a small diameter relative to that of the bored hole, transversely in said bolt to intersect said bored hole such that the drilled hole is tangent to the wall of the bored hole at its outer edge and intersects the bored hole at the midpoint of the depth of said bored hole;

selecting a bar having a diameter which fits snugly in said bored hole;

cutting a groove around said bar, said groove having a depth and width substantially equal to the diameter of the drilled hole, and being set back from a first end of said bar a distance substantially equal to half the depth of said bored hole;

inserting said bar into said bored hole; and pressing a spring pin into said drilled hole.

* * * * *